(12) United States Patent
Voegeli et al.

(10) Patent No.: US 9,004,137 B2
(45) Date of Patent: Apr. 14, 2015

(54) TUBELESS BICYCLE REPAIR APPARATUS

(71) Applicants: Timothy Voegeli, Wichita, KS (US); Philip Voegeli, Wichita, KS (US)

(72) Inventors: Timothy Voegeli, Wichita, KS (US); Philip Voegeli, Wichita, KS (US)

( * ) Notice: Subject to any disclaimer, the term of this patent is extended or adjusted under 35 U.S.C. 154(b) by 54 days.

(21) Appl. No.: 14/033,993

(22) Filed: Sep. 23, 2013

(65) Prior Publication Data

US 2014/0083626 A1    Mar. 27, 2014

Related U.S. Application Data

(60) Provisional application No. 61/744,267, filed on Sep. 24, 2012.

(51) Int. Cl.
| | | |
|---|---|---|
| *B21K 1/34* | (2006.01) | |
| *B25H 1/00* | (2006.01) | |
| *B60C 25/01* | (2006.01) | |

(52) U.S. Cl.
CPC ............ *B25H 1/0014* (2013.01); *B25H 1/0042* (2013.01); *B60C 25/01* (2013.01); *Y10T 29/49494* (2015.01); *Y10T 29/49998* (2015.01)

(58) Field of Classification Search
CPC ...... B60C 25/01; B60C 25/00; B60C 25/002; B60C 25/16; B60C 2200/12
USPC ................... 157/1.5, 1.55, 14, 15, 20
See application file for complete search history.

(56) References Cited

U.S. PATENT DOCUMENTS

| | | | |
|---|---|---|---|
| 4,145,006 A * | 3/1979 | Webb ............... | 269/69 |
| 4,269,096 A | 5/1981 | Boone | |
| 4,910,986 A | 3/1990 | Funkhouser | |
| 4,971,346 A | 11/1990 | Fales et al. | |
| 5,042,795 A | 8/1991 | Bursik | |
| 5,141,211 A * | 8/1992 | Adams, Jr. ............... | 269/16 |
| 5,320,227 A | 6/1994 | Minoura | |
| 5,346,238 A | 9/1994 | Greenfield | |
| 5,385,246 A | 1/1995 | Grossnickle | |
| 5,489,030 A | 2/1996 | Kolbeck et al. | |
| 5,497,967 A | 3/1996 | Gantois | |
| 5,702,006 A | 12/1997 | Durham | |
| 5,765,821 A * | 6/1998 | Janisse et al. .............. | 269/16 |
| 5,842,581 A | 12/1998 | Graefe | |
| 5,996,814 A | 12/1999 | Workman et al. | |
| 6,027,133 A | 2/2000 | Phillips | |
| 6,257,419 B1 | 7/2001 | Kamysiak | |
| 6,273,392 B1 | 8/2001 | Birkhold | |
| 6,976,593 B2 | 12/2005 | Fierstein | |
| 2004/0046091 A1* | 3/2004 | Chuang ............... | 248/125.1 |
| 2005/0173074 A1* | 8/2005 | Routt et al. .............. | 157/19 |
| 2012/0007298 A1* | 1/2012 | Proietti ................. | 269/59 |
| 2012/0255682 A1* | 10/2012 | Orr ............... | 157/14 |

* cited by examiner

*Primary Examiner* — Lee D Wilson
*Assistant Examiner* — Melanie Alexander
(74) *Attorney, Agent, or Firm* — Kagan Binder, PLLC

(57) ABSTRACT

The invention relates to bicycle work stands for making repairs and changing and mounting tubeless tires. There is provided a one-sided wheel work stand with a pivotal upper wheel bracket which allows the user to work unobstructed on the wheel and then acts as a device to lay the wheel flat for better sealing. In related embodiments, the work stand is configured to assist a user in adapting 32 mm 15 QR axle hubs and in truing a bicycle wheel while attached to the work stand.

17 Claims, 4 Drawing Sheets

TUBELESS BICYCLE REPAIR APPARATUS

CLAIM OF PRIORITY

This application claims priority to and the benefit of the provisional application having Ser. No. 61/744,267 with a filing date of Sep. 24, 2012, which is herein incorporated by reference in its entirety.

FIELD OF THE INVENTION

The invention relates to bicycle work stands for making repairs and changing and repairing tires.

BACKGROUND

More and more companies are moving towards incorporating tubeless bicycle tires in their bicycle designs. Major sponsors of the Tour De France are now showing off their new tubeless wheels. However one of the major challenges to transitioning to tubeless tires is the need for adding additional sealant to the tires during installation and regularly about every two to six months.

In addition, purchasing work stands for each wheel repair or service need gets expense as bicycle wheels need truing adjustments or the type of wheel and hub may not always fit with the stand that a user has to service a specialty made wheel.

Therefore there is a need in the industry and by avid cyclists for a work stand that will address the various service and repair needs of cycle wheels.

SUMMARY

In one example embodiment, a cycle work stand is provided for wheel repair including a support post member having an upper end and a lower end and a wheel support bracket having a securing end and a wheel support end, the securing end configured to be operatively coupled in a pivoting relationship to the upper end of said support post assembly, the wheel support bracket adapted to pivot about the support post upper end from about a substantially vertical position to about a substantially horizontal position. The work stand also includes a base member configured to engage the support post member at the lower end in an upright position.

In another example embodiment, a cycle repair assembly is provided that includes a support post member having an upper end and a lower end. In addition, a wheel support bracket is included having a securing end and a wheel support end, the securing end configured to be operatively coupled in a pivoting relationship to the upper end of said support post assembly, the wheel support bracket adapted to pivot about the support post upper end from about a substantially vertical position to about a substantially horizontal position. An advantage to such a design is the portability or retrofit integration to current cycle work stands as the support post member is gripped by a clamping mechanism on the work stand.

In yet another example embodiment, a cycle work stand for wheel repair is provided that includes a support post member having an upper end and a lower end and a wheel support bracket having a securing end and a wheel support end, the securing end configured to be operatively coupled to the upper end of said support post member such that the wheel support bracket is in a vertical position. The wheel support bracket is further adapted to be supported by the upper end of said support post member in a substantially horizontal position. In related embodiment, a base member is provided that is configured to engage the support post member at the lower end in an upright position.

In yet another embodiment, a method is provided of repairing a cycle wheel using a work stand described herein. The method includes the steps of providing a support post member having an upper end and a lower end and providing a wheel support bracket having a securing end and a wheel support end, the securing end configured to be operatively coupled in a pivoting relationship to the upper end of said support post assembly, the wheel support bracket adapted to pivot about the support post upper end from about a substantially vertical position to about a substantially horizontal position. The method further includes the steps of engaging the cycle wheel with the wheel support end of the wheel support bracket when the wheel support bracket is in the vertical position. In a related embodiment, the method of repair includes mounting at least one side of a tubeless tire onto the wheel and adding sealant therein before mounting another side of the tire. Finally, the method includes the step of pumping tire with an earth gas to a desired pressure and pivoting the wheel and wheel support bracket in a horizontal position. Related steps include using a soapy water mix on the wheel rim before putting the tubeless tire to assist with mounting of the tire and creating a bead of sealant around the tire after the gas is introduced.

In yet another related embodiment of a method to repair a cycle wheel with a support stand as described above, the method further includes a method of truing the wheel to be repaired including the steps of locating a removable spacer member having a first end on a wheel to be repaired and spaced from the wheel support bracket and disposing a rod member on a second end of said spacer member, said rod member and spacer member adapted to assist a user for truing a wheel.

An advantage to the cycle work stand disclosed herein as compared to the prior art is that there is provided a one-sided wheel work stand with a pivotal upper wheel bracket which allows the user to work unobstructed on the wheel and then acts as a device to lay the wheel flat for better sealing.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

In another example embodiment, a cycle work stand is provided that is configured to hold a wheel in place that includes three components: a top piece or member that fits into a bottom support and is held in place by a securing pin. A top pin can be removed to allow the top piece to pivot so that a tire can spin on its side while sealant used in mounting or repairing tubeless tires is spread on the inside of the tire. A removable plastic tray (not shown) is used under the wheel and is used as a catch tray for any spilled sealant, and can also be used to hold soapy water which helps to mount a tubeless tire (similar to what a tire shop uses on a car tire). A small looking J hook is used on the outside of a quick release of the bicycle wheel to hold the wheel in the stand in the top slot. Further, an adapter is provided for larger sizes of through axles now being used also. The work stand can either be set on a counter or work table, or mounted in a standard bike work stand.

Figure 1:
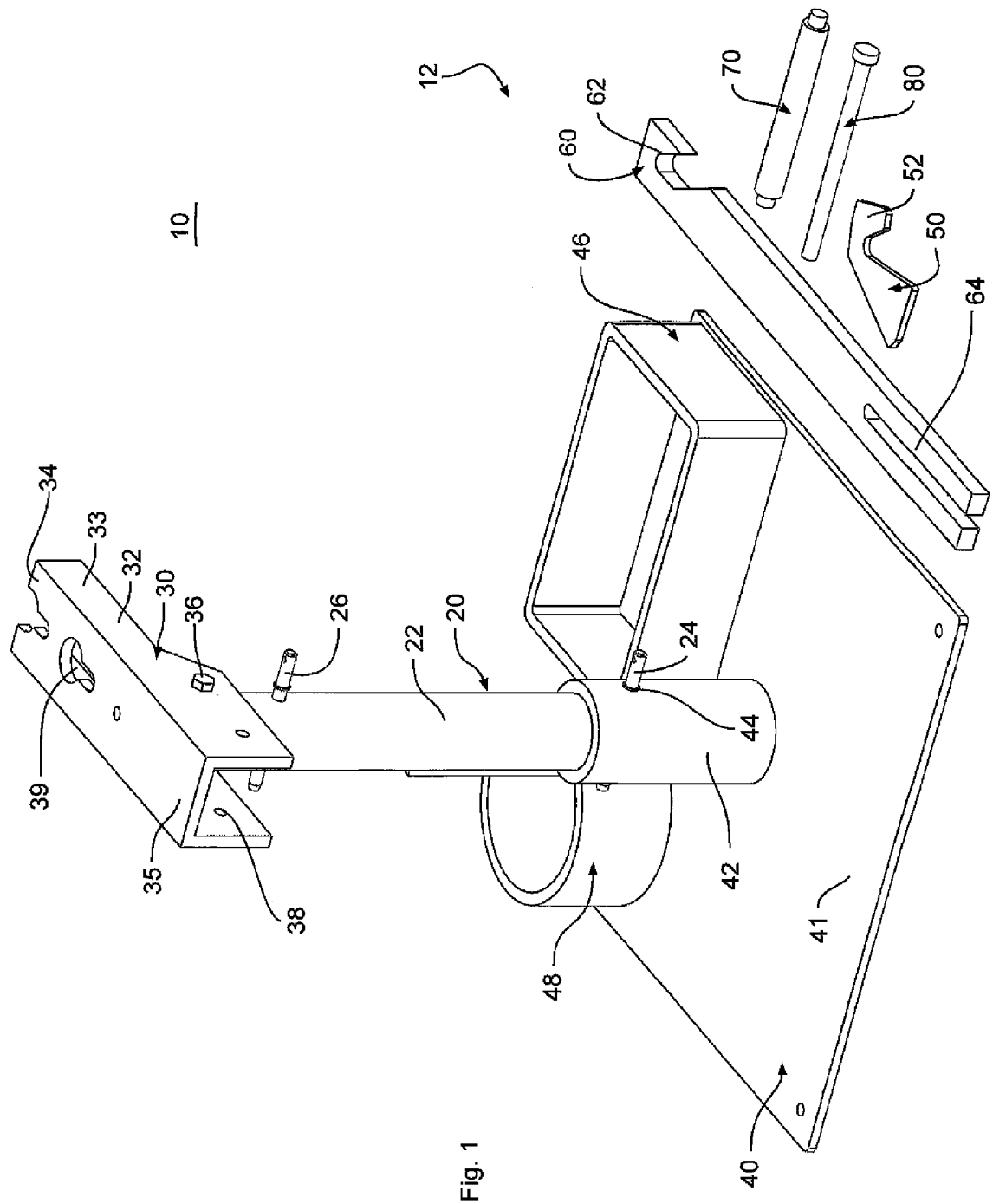
FIG. 1 illustrates a perspective view of an example embodiment of a cycle work stand and accessories according to the teachings herein.

Referring now to the Figures, FIG. 1, there is shown one example embodiment of a cycle or bicycle work stand 10, with accessories or set of components 12, consisting of three major parts a base member 40, a support post member 20 and a wheel mounting bracket 30. Wheel mounting bracket 30 is configured to be mounted on an upper end of a support post 22 having a set of securing pins 24 and 26 threaded therethrough. Support post 22 can also be made of other configurations such as rectangular or it can be a solid pipe or bar. Base member 40 includes a plate 41 that can be made of either metal, or plastic, which is large enough to hold support member 20 and bracket 30 in a stable position when a bicycle wheel is mounted into stand 10. In this example embodiment, base member 40 includes a sleeve 42 mounted perpendicular to plate 41 that is configured to receive a lower end of support post 22. In a related embodiment, sleeve 42 has a diameter that is less than that of support post 22 such that support post 22 fits over and is engaged by sleeve 42. In yet another embodiment, a threaded aperture is included in plate 41 instead of sleeve 42 so as to receive the lower end of the support post that is also threaded. Base plate 41 is configurable to fasten plate 41 to a surface for further stability of stand 10 via screws inserted through plate 41 or by use of clamps or other fastening devices applied on plate 41. The configuration of support post 22 is not necessarily limited to being a hollow cylindrical pipe and includes a solid pipe or tube, a solid or hollow bar that may be rectangular in cross section.

In this example embodiment, base member 40 includes a sleeve or holder 48 configured to hold a $CO_2$ canister (or other earth gas, such as oxygen or plain air), or some other form of a tire pressure filling device. In one example embodiment, two plastic or metal trays are used with one being large enough to go under the bicycle wheel when it is in the upright position, so as to hold water and to catch any sealant that leaks from the tire after its been introduced. The tire sealant is used in tubeless bicycle tires to prevent air from leaking out. In this example, this tray is about 14"×4" and about 3" deep. The second tray can be about 6"×4" and be about 2" deep and can be located behind the center tube 22 and used as a supply and tool tray 46. In a related embodiment, base member 40 need not include sleeve 48 or tray 46. There is also the possibility of locating a wheel truing device either on the base member 40 or on bracket member 30.

Figure 2A:
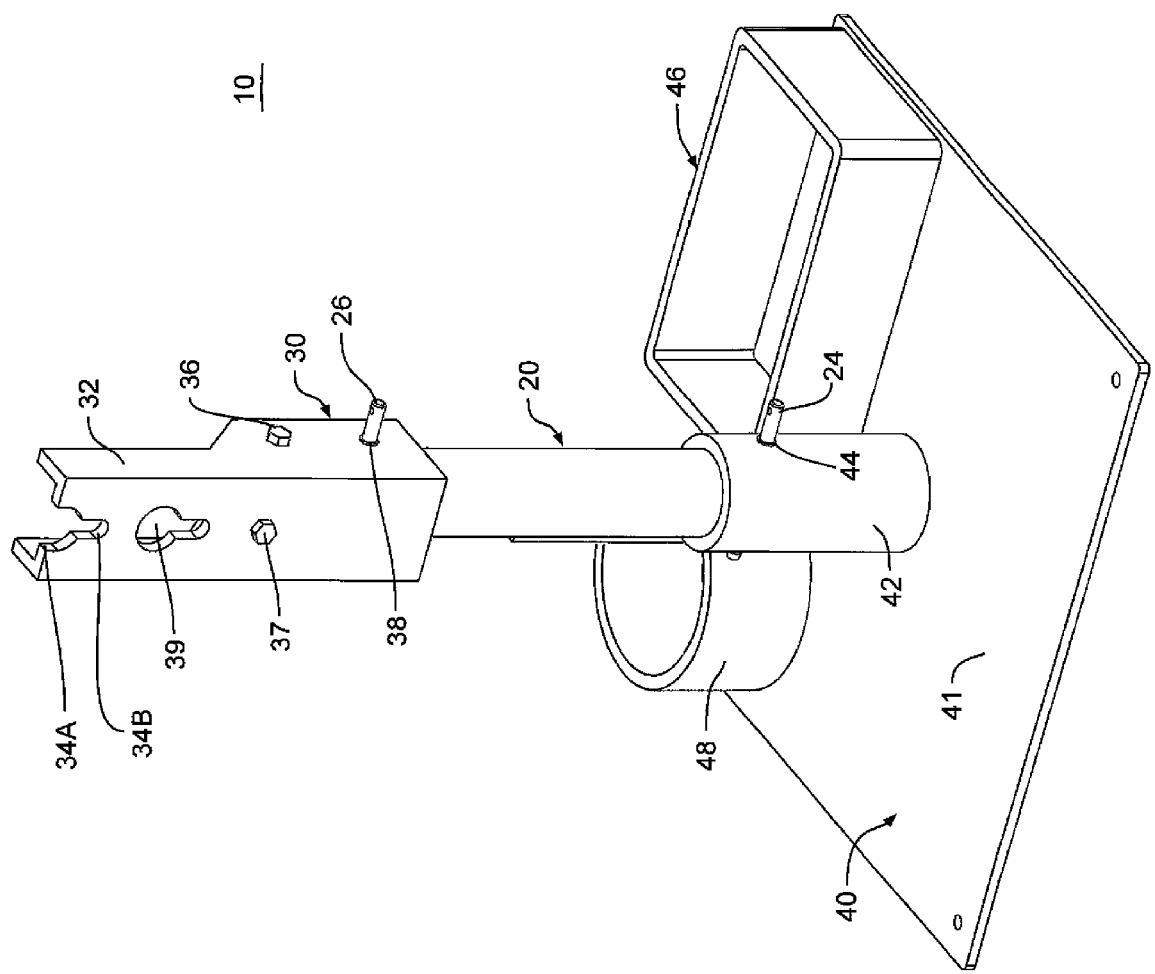
FIGS. 2A-2B illustrate perspective front and back views, respectively, of a cycle work stand according to the teachings herein.
Figure 2B:
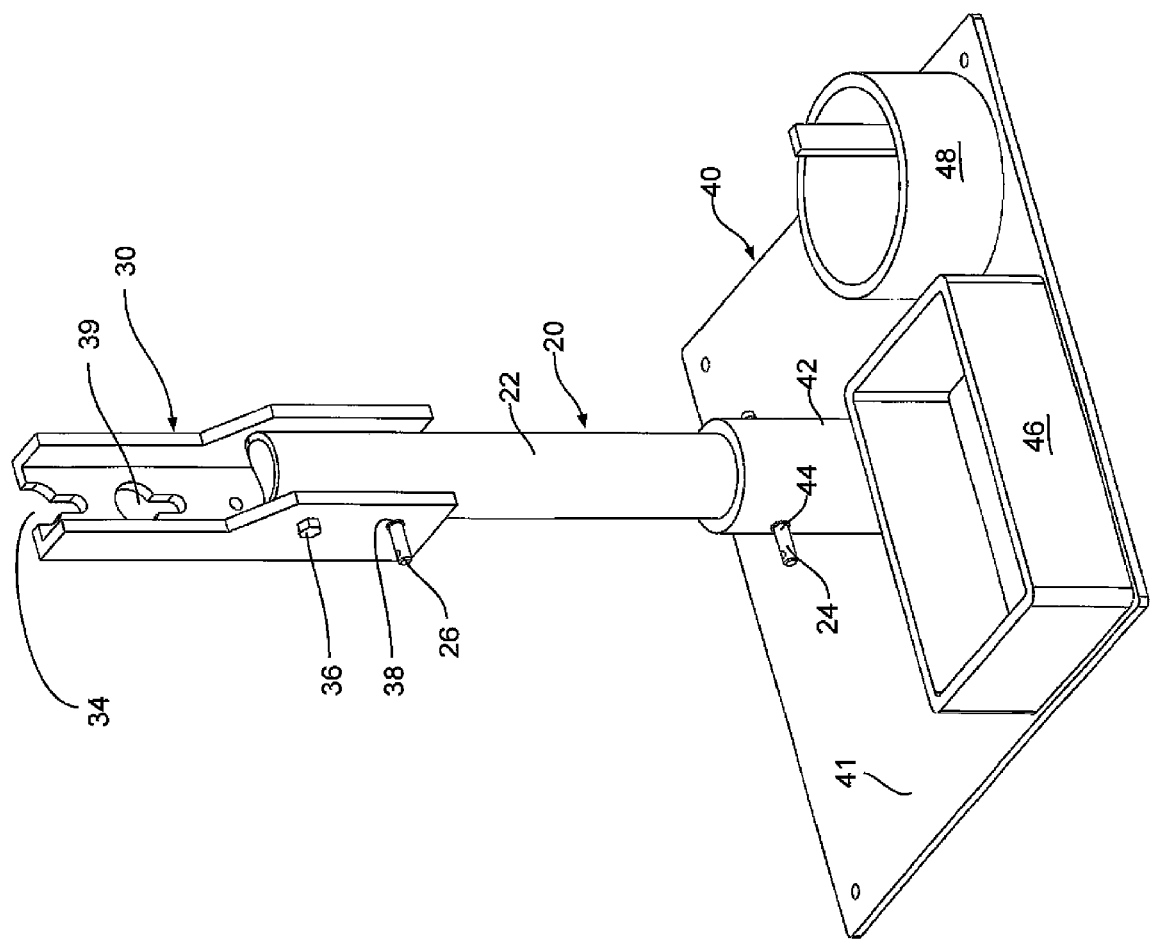

Referring now to FIGS. 2A-2B, in this example embodiment, support tube 22 is designed to connect base 40 to wheel bracket 30 with sufficient length to allow a bicycle tire mounted to a wheel to fit vertically in the stand (see FIG. 2A). The pivoting of wheel bracket 30, which has an upper end 33 that engages the wheel and a lower end 35 that engages support post 22, from a horizontal position of FIG. 1 to a vertical position in FIG. 2A occurs about a pin 36 that pivotably secures wheel bracket 30 to post member 20 at the upper end of post 22. Note from FIG. 2B that the upper end of post 22 is configured to allow bracket 30 to pivot back to a horizontal position and thereafter support wheel bracket 30 and an engaged wheel horizontally. This is to allow for the wheel to be laid flat after a tire is installed to allow the sealant in the tire to spread out evenly. In this example embodiment, post 22 is a rounded tube which allows for the cycle assembly 10 to be moved completely over to a separate work stand and then clamped to it. This then provides the user with a floating table (base member 40) for placing tools and other parts along with the gas canister and soap tray. In a related embodiment, the soapy water tray 46 can be replaced with a soapy water bottle dispenser.

Referring again to FIGS. 1 and 2A-2B, in this example embodiment, wheel bracket 30 is configured in an elongate "C" shape which has larger holes 34A-34B and 39 in the front to allow one side of the bicycle wheel axle to go through without taking off the axle nut or quick release nut. There is a slot (34B) at the bottom of the large holes (34A) which allows the axle to slide down into, with the axle nut or quick release nut used to hold the wheel in place. On the other end of the axle of the wheel a J-hook member 50 has a J-hook slot 52 that engages with the quick release nut of the wheel. Wheel bracket 32 has a pivot hole and pin 36 located in such a place as to allow the weight of the wheel to hold bracket 32 in the horizontal position without any securing pin needed. There is a pin hole 38 in the bottom of bracket 32 which is designed to hold the top piece firmly when in the vertical position with pin 26. A set screw 37 is located on the front of bracket 32, positioned so that it contacts the backside of the upper end of post 22 when bracket 32 is horizontal, and can adjust the angle of bracket 32 to allow for a better horizontal position even if stand 10 is not on a flat area or surface.

In a related embodiment, bracket member 30 is coupled to post member 20 using retractable pins with holes in post member 20 to simplify the work stand and to simplify assembly and disassembly of stand 10. Alternatively, post member 20 has retractable pins that couple to corresponding holes in bracket member 30 for similar purpose.

Referring again to FIG. 1 and the additional components 12, stand 10 is configurable to make other tire or wheel repairs including truing of the wheel. This consists of locating the wheel in an upright or horizontal position to determine if the wheel is "true" or straight or aligned properly to make sure that the rim does not rub up against the brake pads and the wheel rolls properly. Such repairs may include tightening or loosening spokes and wheel nipples or tightening or loosening a wheel hub while the wheel is in stand 10. In this example embodiment, components 12 include an outside axle adapter 70, for use with a bike wheel quick release (movable within wheel axle and hub), that is configured to be located between a wheel hub and the quick release lever on the opposite side of where the wheel is attached to stand 10.

In this example embodiment, tool 60 is attached on the outside of the quick release with hook 62 (similar to spacer part 50 and hook 52 that are used to mount the tubeless tire). A bolt or rod 80 is threaded and is configured to be secured through slot 64 with the use of nuts and washers. A goal is to use bolt 80 to adjust to each tire both horizontally and vertically with respect to the rim of the attached bicycle wheel. When bolt 80 is lined up using slot 64 it will be used to check the true of the wheel while the wheel is attached to stand 10. Set of components 12 are made to adjust to all types and sizes of bike tires. Bolt 80 can be replaced with a number of adjustable mechanisms, including a spring or pressure resisted slide mechanisms so long as they can be held in a specific position vertically and horizontally in relation to the rim and remain stable to check the true of the rim attached either at hole 39 or hole 34.

In a related embodiment, tool 70 is an axle adapter specifically made to adapt stand 10 for the use with 32 millimeter 15 OR axle systems (www.Ridefox.com provides instructions for 32 mm 15 QR axle system installation instructions, the teachings of which are incorporated herein by reference in their entirety). In this example, tool 70 is configured to slide into a 32 millimeter hole of a specifically manufactured wheel hub and allows stand 10 to be used in accordance with the normal procedures outlined above but is configurable for axles of other sizes. In this example, the larger hub hole and the threaded non-quick release side (with a nut tightener) goes straight into the bicycle fork. Tool 70 allows a normal quick release screw to be adapted for such use. On a 32 mm 15 QR hub, the originally supplied thicker screw is usually removed. Tool 70 is then placed into the wheel hub. The normal screw is placed through tool 70. The 32 mm 15 QR can now be mounted on stand 10 and worked on like a normal wheel.

Figure 3:
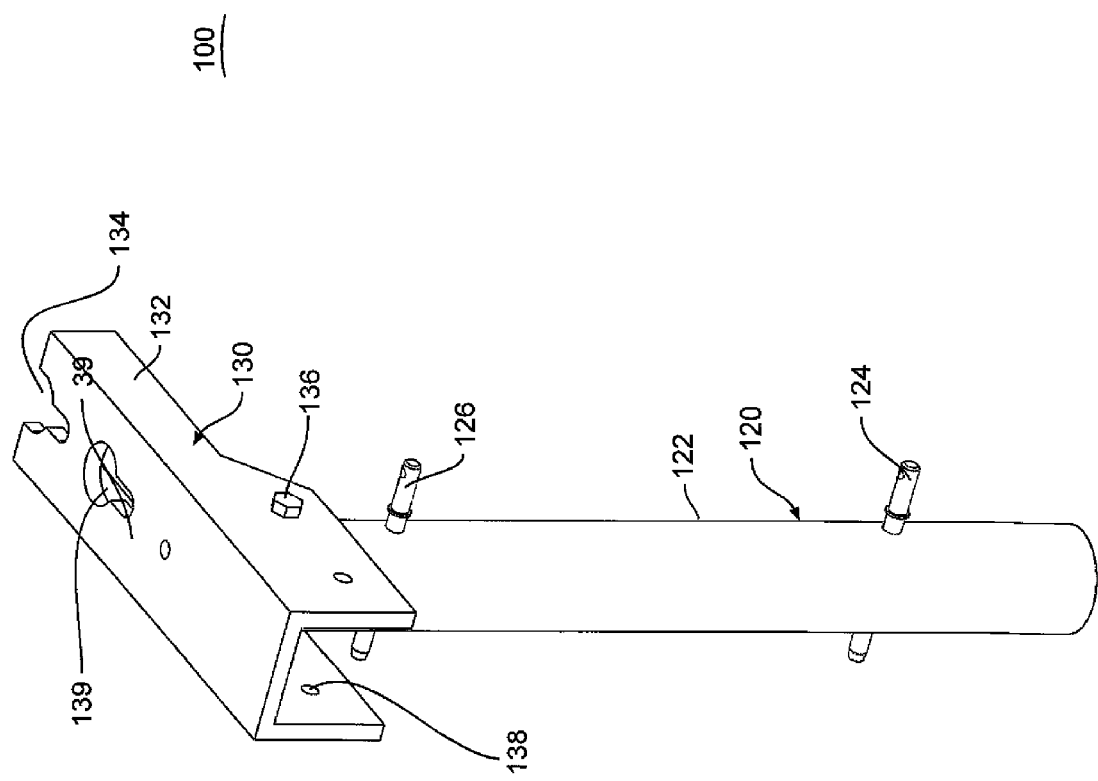
FIG. 3 illustrates a perspective view of a cycle repair assembly according to the teachings herein.

Referring now to FIG. 3, there is provided an example embodiment of a cycle or bicycle repair assembly 100 consisting of two components: a support post member 120 and a wheel mounting bracket 130. Wheel mounting bracket 130 is configured to be mounted on an upper end of a support post 122 having a set of securing pins 124 and 126 threaded therethrough. Support post 122 can also be made of other configurations such as rectangular or it can be a solid pipe or bar. Similar to work stand 10, wheel bracket 130 can pivot vertically from the shown horizontal position. Cycle repair assembly 100 is ideal as a retrofit device where the user already has a bicycle work stand that is used for other repairs and wishes to transition over to mounting a tubeless tire on a wheel without too much disruption or effort.

In yet another embodiment, a method of repairing a cycle wheel adapted to use a tubeless tire is provided herein including the steps of providing a support post member having an upper end and a lower end and providing a wheel support bracket having a securing end and a wheel support end, the securing end configured to be operatively coupled in a pivoting relationship to the upper end of said support post assembly, the wheel support bracket adapted to pivot about the support post upper end from about a substantially vertical position to about a substantially horizontal position The method also includes the steps of engaging the cycle wheel with the wheel support end of the wheel support bracket when the wheel support bracket is in the vertical position and mounting at least one side of a tubeless tire onto the wheel and adding sealant therein before mounting another side of the tire. Finally the tire is pumped with an earth gas to a desired pressure and pivoting the wheel and wheel support bracket in a horizontal position. While the wheel is in the horizontal position, the wheel is spun to spread the sealant evenly within the wheel. Then the wheel is removed from the bracket, flipped around and fastened horizontally in the bracket and once again spun around to spread the sealant within the wheel.

In this example embodiment, the tire is injected with a blast of pressure of $CO_2$ to seal (and spread the sealant) before pumping the tire with air to the desired pressure. Tubeless tires typically require a blast of air to effectively "pop" the tire onto the rim and such is performed in a vertical position. The tire is then placed horizontally and spun to ensure sealant is spread throughout the tire. In order to achieve the proper seal, the gas is forced into the tire at a high PSI while the tire is vertical. After you seal, you then move the tire from vertical to horizontal and let it sit and spin for a few minutes.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A cycle work stand for wheel repair comprising:
   a support post member having an upper end and a lower end;
   a wheel support bracket having a securing end and a wheel support end, the securing end configured to be operatively coupled to the upper end of said support post member such that the wheel support bracket is in a vertical position, said wheel support bracket further adapted to be supported by the upper end of said support post member in a substantially horizontal position;
   a base member configured to engage said support post member at the lower end in an upright position; and
   a removable spacer member adapted to be spaced from the wheel support bracket and located on a wheel to be repaired, said spacer member assisting to secure the wheel on the wheel support bracket.

2. The cycle work stand of claim 1 wherein the wheel support bracket is configured such that securing end is operatively coupled in a pivoting relationship to the upper end of said support post member, said wheel support bracket adapted to pivot about the support post upper end from about the substantially vertical position to about the substantially horizontal position.

3. The cycle work stand of claim 1 wherein the wheel support bracket includes therein at least one aperture adapted to receive a portion of an axle of a wheel to be repaired.

4. The cycle work stand of claim 1 further including an axle adapter member configured to adapt the wheel support bracket to 32 mm axles.

5. The cycle work stand of claim 1 wherein the base member includes thereon a sleeve configured to hold a canister of earth gas.

6. The cycle work stand of claim 1 wherein the base member includes thereon a tray member.

7. A cycle work stand for wheel repair comprising:
   a support post member having an upper end and a lower end;
   a wheel support bracket having a securing end and a wheel support end, the securing end configured to be operatively coupled to the upper end of said support post member such that the wheel support bracket is in a vertical position, said wheel support bracket further adapted to be supported by the upper end of said support post member in a substantially horizontal position;
a base member configured to engage said support post member at the lower end in an upright position; and
a removable elongated spacer member adapted to be spaced from the wheel support bracket and having a first end located on a wheel to be repaired.

8. The cycle work stand of claim 7 further including a rod member adapted to be disposed a second end of said elongate spacer member and configured to assist a user in truing the wheel.

9. A cycle repair assembly comprising:
a support post member having an upper end and a lower end; and
a wheel support bracket having a securing end and a wheel support end, the securing end configured to be operatively coupled to the upper end of said support post member such that the wheel support bracket is in a vertical position, said wheel support bracket further adapted to be supported by the upper end of said support post member in a substantially horizontal position; and
a removable spacer member adapted to be spaced from the wheel support bracket and having a first end located on a wheel to be repaired, said spacer member having a rod member disposed on a second end of said spacer member, said rod member and spacer member adapted to assist a user for truing a wheel.

10. The cycle repair assembly of claim 9 adapted to be supported by a bicycle work stand, said support post member being engaged at the lower end in an upright position.

11. The cycle repair assembly of claim 9 wherein the wheel support bracket is configured such that securing end is operatively coupled in a pivoting relationship to the upper end of said support post member, said wheel support bracket adapted to pivot about the support post upper end from about the substantially vertical position to about the substantially horizontal position.

12. The cycle repair assembly of claim 9 further comprising a base member configured to engage said support post member at the lower end in an upright position.

13. A method of repairing a cycle wheel adapted to use a tubeless tire, the method comprising the steps of:
providing a support post member having an upper end and a lower end;
providing a wheel support bracket having a securing end and a wheel support end, the securing end configured to be operatively coupled in a pivoting relationship to the upper end of said support post assembly, said wheel support bracket adapted to pivot about the support post upper end from about a substantially vertical position to about a substantially horizontal position;
engaging the cycle wheel with the wheel support end of the wheel support bracket when the wheel support bracket is in the vertical position; and
locating a removable spacer member having a first end on a wheel to be repaired and spaced from the wheel support bracket and disposing a rod member on a second end of said spacer member, said rod member and spacer member adapted to assist a user for truing a wheel.

14. The method of claim 13 further comprising the steps of mounting at least one side of a tubeless tire onto the wheel and adding sealant therein before mounting another side of the tire, and pumping tire with an earth gas to a desired pressure and pivoting the wheel and wheel support bracket in a horizontal position.

15. The method of claim 13 further comprising the step of engaging the support post member to a base member configured to engage said support post member at the lower end in an upright position.

16. The method of claim 13 further comprising the step of engaging the support post member to a bicycle work stand, said support post member being engaged at the lower end in an upright position.

17. The method of claim 13 further comprising the step of providing an axle adapter member configured to adapt the wheel support bracket to 32 mm axles.

* * * * *